United States Patent
Stevanovic et al.

(10) Patent No.: US 11,302,292 B2
(45) Date of Patent: Apr. 12, 2022

(54) METHOD, AN APPARATUS AND A COMPUTER PROGRAM FOR DISPLAY CONTENTS GENERATION

(71) Applicant: HUAWEI TECHNOLOGIES CO., LTD., Guangdong (CN)

(72) Inventors: Zoran Stevanovic, Kista (SE); Aliaksei Katovich, Kista (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/932,958

(22) Filed: Jul. 20, 2020

(65) Prior Publication Data

US 2020/0349906 A1 Nov. 5, 2020

Related U.S. Application Data (63) Continuation of application No. PCT/EP2018/061701, filed on May 7, 2018.

(51) Int. Cl.
*G09G 5/00* (2006.01)
*G09G 5/377* (2006.01)
*G09G 5/393* (2006.01)
*G09G 5/395* (2006.01)

(52) U.S. Cl.
CPC ............ *G09G 5/377* (2013.01); *G09G 5/393* (2013.01); *G09G 5/395* (2013.01); *G09G 2340/12* (2013.01); *G09G 2370/00* (2013.01)

(58) Field of Classification Search
CPC .. G09G 2340/10; G09G 5/14; G09G 2340/12; G09G 5/377; G09G 5/395; G09G 5/026; G09G 5/393; G09G 5/397; G06T 15/503
See application file for complete search history.

(56) References Cited

U.S. PATENT DOCUMENTS

| | | | |
|---|---|---|---|
| 2010/0079489 A1 | 4/2010 | Cheng et al. | |
| 2013/0069981 A1* | 3/2013 | Mak-Fan | G09G 5/14 345/629 |
| 2015/0084986 A1 | 3/2015 | Lee et al. | |
| 2016/0163280 A1* | 6/2016 | Weyrich | G06T 1/20 345/520 |
| 2017/0329613 A1 | 11/2017 | Croxford et al. | |

FOREIGN PATENT DOCUMENTS

CA 2752344 A1 3/2013

OTHER PUBLICATIONS

International Search Report and Written Opinion issued in PCT/EP2018/061701 dated Jul. 13, 2018, 17 pages.

* cited by examiner

*Primary Examiner* — Hau H Nguyen (57) ABSTRACT

A method, an apparatus and a computer program for display contents generation are provided. The disclosed solution enables display contents generation in a case where several application window surfaces are visible at the same time and the number of application window surfaces exceeds the number of available hardware layers in a display subsystem (DSS). In the disclosed solution, the display subsystem is sequentially used to composite a final display frame.

19 Claims, 4 Drawing Sheets

METHOD, AN APPARATUS AND A COMPUTER PROGRAM FOR DISPLAY CONTENTS GENERATION

CROSS-REFERENCE TO RELATED APPLICATIONS

This application is a continuation of International Application No. PCT/EP2018/061701, filed on May 7, 2018, the disclosure of which is hereby incorporated by reference in its entirety.

TECHNICAL FIELD

The present application relates to the field of computer technology, and more particularly to graphical user interfaces and a solution for generating display contents based on compositing in the display subsystem.

BACKGROUND

Graphical user interfaces of modern operating systems have a windowing support. An application typically renders its contents in a dedicated, rectangular, two-dimensional area that is commonly referred to as a window or window surface. To combine rendered views from all running applications, the operating system needs to composite the window surfaces into a final, combined view that is then sent to a device display. The final compositing may be based on the windows' positions, sizes, transparences, and other features. Further, the final compositing for window surfaces may be done in different ways, depending on available hardware resources and capabilities of the hardware resources. However, performance and power consumption of compositing differ between the different hardware resources.

It would be beneficial to be able to effectively utilize hardware resources for window surface compositing procedures.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

It is an objective of this disclosure to provide a solution for compositing a final display frame. A solution is provided for display contents generation in a case where several application window surfaces are visible at the same time and the number of application window surfaces exceeds the number of available hardware layers in a display subsystem (DSS). In a solution according to an embodiment, the display subsystem is sequentially used to composite the final display frame.

This objective is achieved by the features of the independent claims. Further embodiments and examples are apparent from the dependent claims, the description and the drawings.

According to a first aspect, a method for display contents generation is provided. The method comprises selecting data of multiple application window surfaces stored in a memory, wherein an initial number of the application window surfaces exceeds the number of available hardware layers of a display subsystem; feeding data of the selected multiple window surfaces to the available hardware layers; compositing an intermediate frame by a compositor of the display subsystem based on the contents of the fed hardware layers; selecting data of at least one previously non-selected application window surface stored in the memory; feeding the intermediate frame and data of the selected at least one previously non-selected application window surface to the available hardware layers; and compositing a subsequent frame by the compositor based on the contents of the fed hardware layers. This enables display contents generation by performing a composition procedure using only the display subsystem sequentially even when the number of application window surfaces to be composited exceeds the number of available hardware layers in the display subsystem. Thus, by using only the display subsystem this also decreases the load of other hardware resources. Further, a solution is provided in which a graphical processing unit (GPU) will be available for applications to render their content for the next frame while a previous frame composition is still ongoing, thus enabling asynchronous composition and GPU offloading. This may also improve overall system performance.

In an implementation of the first aspect, an initial number of the selected application window surfaces corresponds to the number of the available hardware layers. This enables utilizing the hardware capabilities optimally for the composition of the application window surfaces.

In a further implementation of the first aspect, the method further comprises storing the intermediate frame in the memory. This enables feeding the intermediate frame with the next application window surfaces from the memory to the available hardware layers for composition. Further, the intermediate frame may be at disposal for other purposes.

In a further implementation of the first aspect, the method further comprises storing the subsequent frame in the memory by replacing the previously stored intermediate frame. This enables feeding the subsequent frame with the next application window surfaces from the memory to the available hardware layers for composition. Further, the latest composited frame may be at disposal for other purposes.

In a further implementation of the first aspect, feeding the intermediate frame and data of the selected at least one previously non-selected application window surface to the available hardware layers comprises, when the number of the remaining non-selected application window surfaces is equal or exceeds the number of the hardware layers, feeding each of the available hardware layers with one of the previously non-selected application window surfaces or the intermediate frame. This enables utilizing the display subsystem hardware capabilities optimally in the composition procedure by using each available hardware layer also when aggregating the resulted intermediate frame with the next application window surfaces not yet used in the composition procedure.

In a further implementation of the first aspect, when the number of the remaining non-selected application window surfaces is equal or exceeds the number of the hardware layers, the subsequent frame is used as the intermediate frame and the method further comprises the following sequence at least once: selecting data of at least one previously non-selected application window surface stored in the memory; feeding the intermediate frame and data of the selected at least one previously non-selected application window surface to the available hardware layers; and compositing a subsequent frame by the compositor based on the contents of the fed hardware layers. This enables display content generation by sequentially compositing the previously non-selected application window surfaces with the resulted frame of the previous composition.

In a further implementation of the first aspect, selecting data of the at least one previously non-selected application window surface comprises selecting all of the remaining non-selected application window surfaces when the number of the remaining non-selected application window surfaces is smaller than the number of available hardware layers. This enables using an optimal amount of composition rounds for compositing the application window surfaces.

In a further implementation of the first aspect, the subsequent frame comprises a final frame, and the method further comprises causing transmission of the final frame to at least one of at least one display connector, at least one external connector and a virtual display. This enables sending the resulted combined view of all running applications to, for example, a primary display and other peripherals.

According to a second aspect, there is provided an apparatus for display contents generation. The apparatus comprises a memory configured to store data of multiple application window surfaces; a display subsystem comprising hardware layers and a compositor; wherein the apparatus is configured to select data of multiple application window surfaces stored in the memory, wherein an initial number of the application window surfaces exceeds the number of available hardware layers of a display subsystem; feed data of the selected multiple window surfaces to the available hardware layers; composite an intermediate frame by the compositor based on the contents of the fed hardware layers; select data of at least one previously non-selected application window surface stored in the memory; feed the intermediate frame and data of the selected at least one previously non-selected application window surface to the available hardware layers; and composite a subsequent frame by the compositor based on the contents of the fed hardware layers. This enables display contents generation by performing a composition procedure using only the display subsystem sequentially even when the number of application window surfaces to be composited exceeds the number of available hardware layers in the display subsystem. Thus, by using only the display subsystem this also decreases the load of other hardware resources. Further, a solution is provided in which a graphical processing unit (GPU) will be available for applications to render their content for the next frame while a previous frame composition is still ongoing, thus enabling asynchronous composition and GPU offloading. This may also improve overall system performance.

In an implementation of the second aspect, an initial number of the selected application window surfaces corresponds to the number of the available hardware layers. This enables utilizing the hardware capabilities optimally for composition.

In a further implementation of the second aspect, the apparatus is configured to store the intermediate frame in the memory. This enables feeding the intermediate frame with the next application window surfaces from the memory to the available hardware layers for composition. Further, the intermediate frame may be at disposal for other purposes.

In a further implementation of the second aspect, the apparatus is configured to store the subsequent frame in the memory by replacing the previously stored intermediate frame. This enables feeding the intermediate frame with the next application window surfaces from the memory to the available hardware layers for composition. Further, the latest composited frame may be at disposal for other purposes.

In a further implementation of the second aspect, when feeding the intermediate frame and data of the selected at least one previously non-selected application window surface to the available hardware layers, the apparatus is configured to, when the number of the remaining non-selected application window surfaces is equal or exceeds the number of the hardware layers, feed each of the available hardware layers with one of the previously non-selected application window surfaces or the intermediate frame. This enables utilizing the display subsystem hardware capabilities optimally in the composition procedure by using each available hardware layer also when aggregating the resulted intermediate frame with the next application window surfaces not yet used in the composition procedure.

In a further implementation of the second aspect, when the number of the remaining non-selected application window surfaces is equal or exceeds the number of the hardware layers, the subsequent frame is used as the intermediate frame and the wherein the apparatus is further configured to perform the following sequence at least once: select data of at least one previously non-selected application window surface stored in the memory; feed the intermediate frame and data of the selected at least one previously non-selected application window surface to the available hardware layers; and composite a subsequent frame by the compositor based on the contents of the fed hardware layers. This enables display content generation by sequentially compositing the previously non-selected application window surfaces with the resulted frame of the previous composition.

In a further implementation of the second aspect, when selecting data of the at least one previously non-selected application window surface, the apparatus is configured to select all of the remaining non-selected application window surfaces when the number of the remaining non-selected application window surfaces is smaller than the number of available hardware layers. This enables using an optimal amount of composition rounds for compositing the application window surfaces.

In a further implementation of the second aspect, the subsequent frame comprises a final frame, and the apparatus is configured to cause transmission of the final frame to at least one of at least one display connector, at least one external connector and a virtual display. This enables sending the resulted combined view of all running applications to, for example, a primary display and other peripherals.

According to a third aspect, there is provided a computer program comprising program code which when executed by a processor, causes the processor to perform the method according to the first aspect. This enables display contents generation by performing a composition procedure using only the display subsystem sequentially even when the number of application window surfaces to be composited exceeds the number of available hardware layers in the display subsystem. Thus, by using only the display subsystem this also decreases load of other hardware resources. Further, a solution is provided in which a graphical processing unit (GPU) will be available for applications to render their content for the next frame while a previous frame composition is still ongoing, thus enabling asynchronous composition and GPU offloading. This may also improve overall system performance.

According to a fourth aspect, there is provided a computing device comprising the apparatus according to the second aspect. This enables display contents generation by performing a composition procedure using only the display subsystem sequentially even when the number of application window surfaces to be composited exceeds the number of available hardware layers in the display subsystem. Thus, by using only the display subsystem this also decreases load of other hardware resources. Further, a solution is provided in which a graphical processing unit (GPU) will be available for applications to render their content for the next frame while a previous frame composition is still ongoing, thus enabling asynchronous composition and GPU offloading. This may also improve overall system performance.

BRIEF DESCRIPTION OF THE DRAWINGS

In the following examples are described in more detail with reference to the attached drawings, in which.

In the following, identical reference signs refer to identical or at least functionally equivalent features.

DETAILED DESCRIPTION

In the following description, reference is made to the accompanying drawings, which form part of the disclosure, and in which are shown, by way of illustration, specific aspects and examples in which the present subject-matter may be placed. It is understood that other aspects may be utilized and structural or logical changes may be made without departing from the scope of the present subject-matter. The following detailed description, therefore, is not to be taken in a limiting sense, as the scope of the present subject-matter is defined in the appended claims.

For instance, it is understood that a disclosure in connection with a described method may also hold true for a corresponding device or system configured to perform the method and vice versa. For example, if a specific method step is described, a corresponding device may include a unit or other means to perform the described method step, even if such unit is not explicitly described or illustrated in the drawings. On the other hand, for example, if a specific apparatus is described based on functional units, a corresponding method may include a step performing the described functionality, even if such step is not explicitly described or illustrated in the drawings. Further, it is understood that the features of the various exemplary aspects described herein may be combined with each other, unless specifically noted otherwise.

Typically, display contents generation may start when a newly started application requests a window surface from a window manager. The application then generates graphical content on the window surface. The graphical content may be generated using the operating system's rendering engine. Alternatively, the content may be generated on a graphical processing unit (GPU) driver. A compositor, or a compositing window manager, combines the window surfaces from all visible applications and generates the final frame using, for example, the GPU, a display subsystem (DSS), or both, depending on the number of the window surfaces. For example, in situations where several application window surfaces are visible simultaneously and the number of the window surfaces exceeds the number of available hardware layers in the display subsystem, the application window surfaces may be sent to the GPU for final compositing.

The purpose is to provide a solution that utilizes only the display subsystem hardware for compositing a final display frame. In the solution, hardware layers of the display subsystem are sequentially used to composite a final display frame from application window surfaces and an intermediate frame stored in a memory. This enables display subsystem based compositing even when the number of application window surfaces to be composited exceeds the number of the hardware layers in the display subsystem. This also provides a solution in which a graphical processing unit (GPU) will be available for applications to render their content for the next frame while a previous frame composition is still ongoing, thus enabling asynchronous composition and GPU offloading. This may also improve overall system performance.

Figure 1:
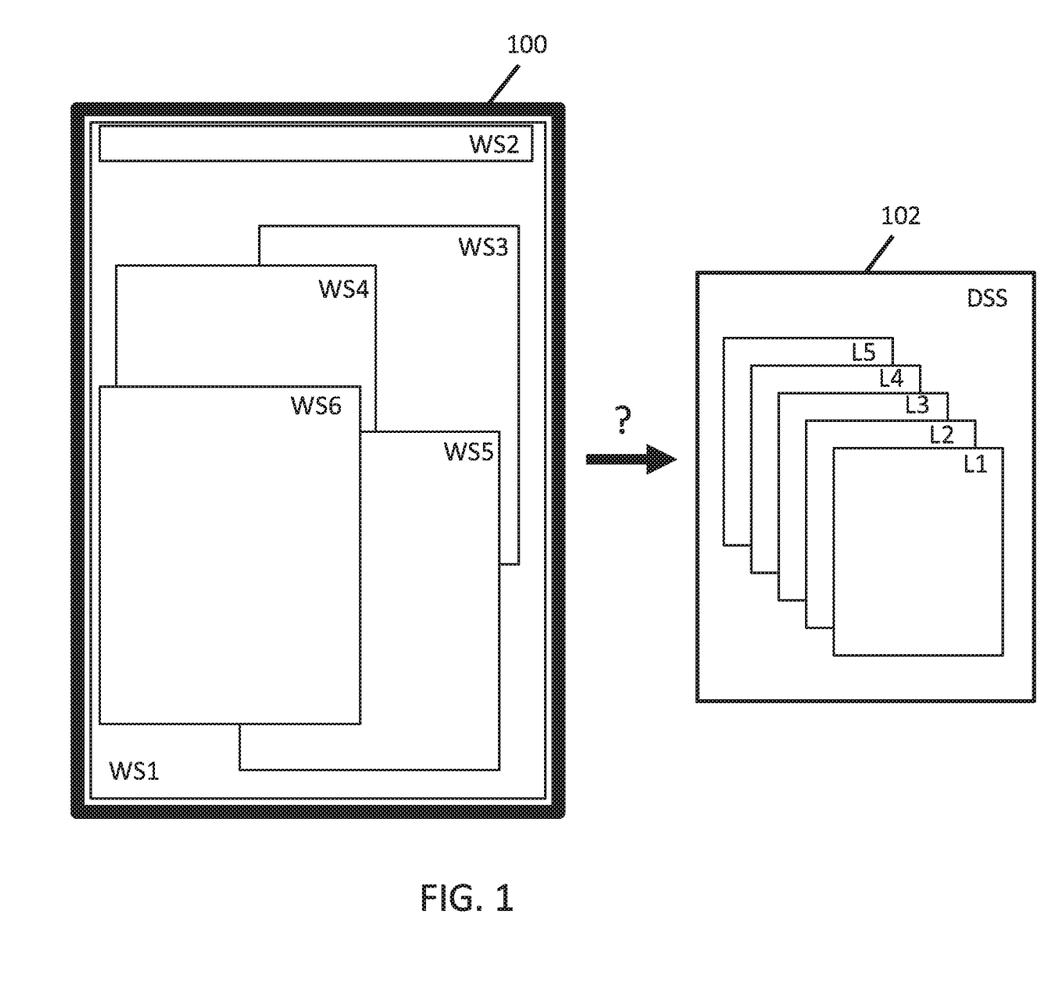
FIG. 1 illustrates schematic representation of a scenario in which the number of application window surfaces to be composited exceeds the number of hardware layers available in a display subsystem.

FIG. 1 illustrates schematic representation of a scenario in which the number of window surfaces to be composited exceeds the number of hardware layers available in a display subsystem 102.

In FIG. 1, the final frame of a display 100 to be composited comprises six window surfaces WS1, WS2, WS3, WS4, WS5, and WS6. However, in this example, the display subsystem 102 comprise only five hardware layers (or overlays) L1, L2, L3, L4, and L5. Typically, a display subsystem implementation has a limited number of hardware layers due to the cost associated with them. In case the number of the visible applications window surfaces exceeds the number of the hardware layers, the operating system typically performs a GPU based compositing of window surfaces and then sends the final frame to DSS, thus utilizing only one hardware layer or overlay. This means that the load of the GPU may increase, and the operation may take GPU resources away from applications that need the GPU for rendering their scenes.

Figure 2:
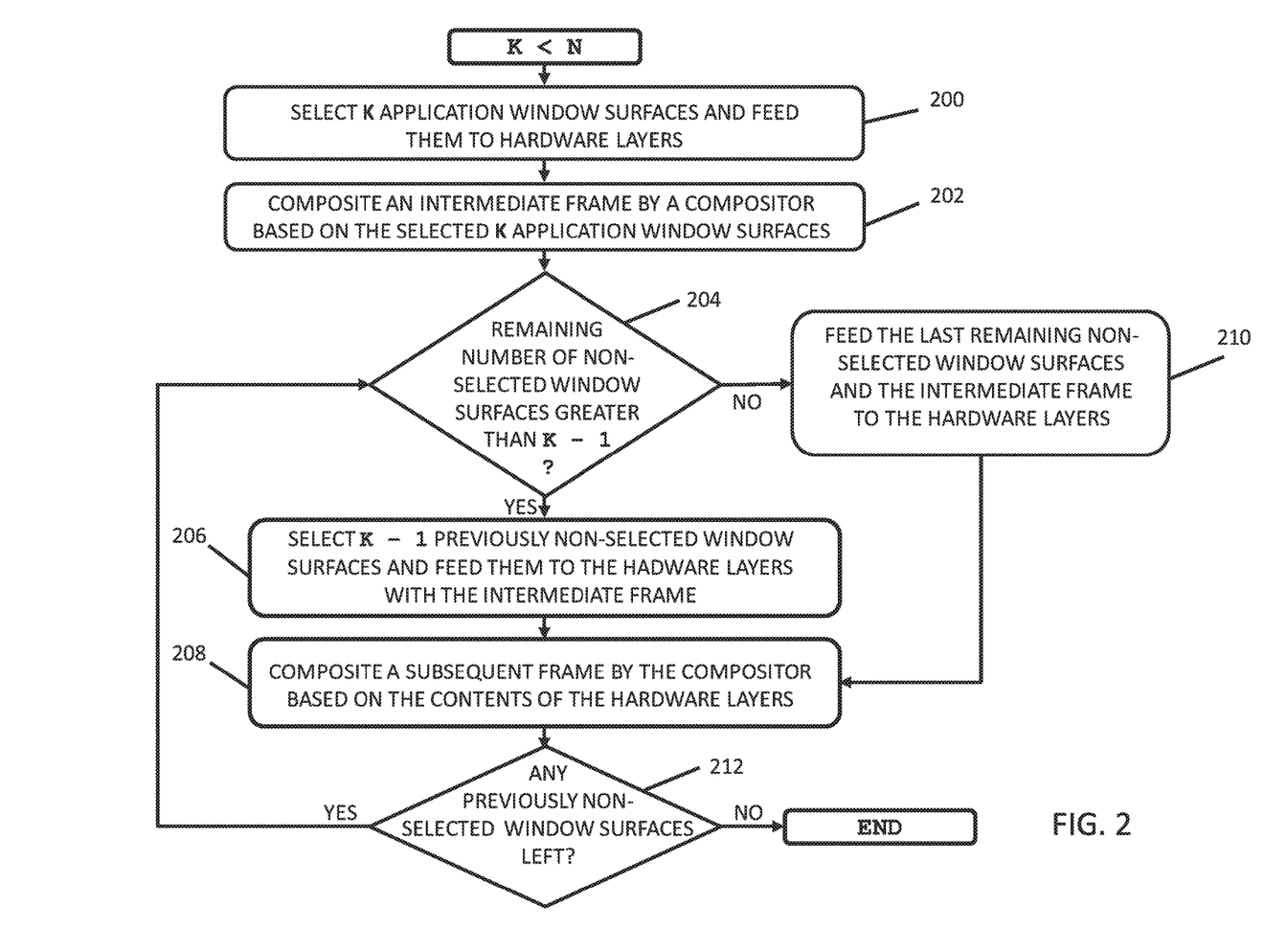
FIG. 2 illustrates a flowchart of a method for display contents generation using only a display subsystem when an initial number of application window surfaces exceeds the number of available hardware layers of the display subsystem.

FIG. 2 illustrates a flowchart of a method for display contents generation using only a display subsystem when an initial number of application window surfaces exceeds the number of available hardware layers of the display subsystem. In FIG. 2, the number of application window surfaces to be composited is N and the number of available hardware layers in the display subsystem is K.

For any K<N, data of multiple application window surfaces stored in a memory is selected and fed to the hardware layers at 200. The number of selected application window surfaces may correspond to the number of the available hardware layers such that at first K application window surfaces are selected.

At 202 an intermediate frame is composited by a compositor of the display subsystem based on the contents of the hardware layers. The selected K application window surfaces may be composited to form an intermediate frame. The intermediate frame may also be stored in the memory for subsequent use.

At 204 it is determined if the remaining number of the application window surfaces is greater than K−1. If the number of remaining application window surfaces is smaller (or not greater) than K−1, at 210 all of the remaining previously non-selected window surfaces are selected and fed to the available hardware layers in conjunction with the intermediate frame provided at 202. If the number of remaining application window surfaces is greater than K−1, the processing proceeds to 206.

At 206 K−1 previously non-selected application window surfaces are selected and fed to the available hardware layers together with the intermediate frame. Each of the hardware layers may be fed with one of the now selected application window surfaces or the intermediate frame. In other words, one of the hardware layers comprises the intermediate frame and each remaining hardware layer is either empty or comprises data associated with an application window surface.

At 208 a subsequent frame is composited by the compositor based on the contents of the hardware layers. The subsequent frame may be stored in the memory, and the subsequent frame may replace the earlier stored intermediate frame as a new intermediate frame.

At 212, it is determined if there are any previously non-selected application window surfaces left in the memory. If there are previously non-selected application window surfaces left in the memory, the composition procedure returns back to 204. Otherwise, the latest subsequent frame may be regarded as a final frame and a combined view of application window surfaces of all running applications has been generated.

In the solution disclosed above a graphical processing unit (GPU) will be available for applications to render their content for the next frame while a previous frame composition is still ongoing, thus enabling asynchronous composition and GPU offloading. This may also improve overall system performance.

Figure 3:
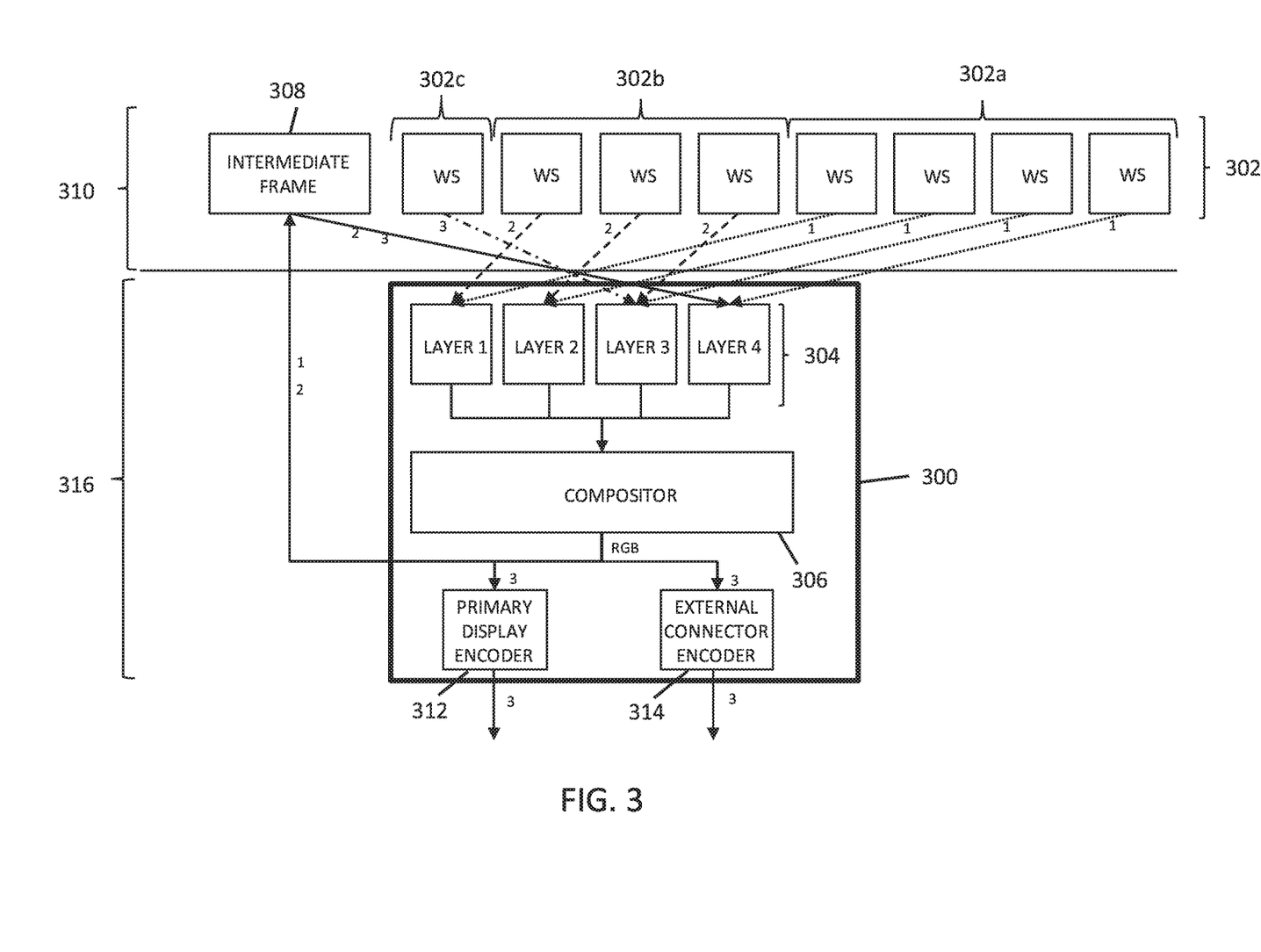
FIG. 3 illustrates schematic representation of an exemplary display subsystem configuration and its operation.

FIG. 3 illustrates schematic representation of an exemplary display subsystem 300 configuration. FIG. 3 also illustrates a composition procedure discussed already in relation to FIG. 2. FIG. 3 illustrates an exemplary structure of the display subsystem 300 and an exemplary number of application window surfaces and hardware layer. The display subsystem 300 may be arranged, for example, in a computing device, for example, a smartphone, a tablet computer or a computer.

In FIG. 3, the display subsystem 300 comprises four hardware layers 304. There may be several applications running in an apparatus. FIG. 3 illustrates an example in which there are eight application window surfaces 302 to be composited. Each application window surface may relate to a separate application executed by the apparatus. The application window surfaces 302 may be stored in a memory 310. Because the number of the application window surfaces 302 exceeds the number of available hardware layers 304, the display content generation may be implemented by several compositing sequences. The composition procedure may comprise compositing an intermediate frame from part of the application window surfaces and then sequentially aggregating previously non-selected application window surfaces with the resulted intermediate frame.

As an example, the procedure may start by selecting and feeding as many application window surfaces 302 into the display subsystem 300 as there are available hardware layers 304. In the example illustrated in FIG. 3, four application window surfaces 302a may be fed to the four hardware layers 304. This is further identified by the number "1" associated with arrows from the application window surfaces 302a towards the hardware layers 304. The fed application window surfaces 302a may be the top window surfaces in the memory. Alternatively, the procedure may be implemented in a reverse order, starting with the bottom application window surfaces 302c, 302b and moving up from there. The contents of the hardware layers may be fed to a compositor 306 for compositing an intermediate frame. The resulting intermediate frame 308 may then be stored in the memory 310. Although the example of FIG. 3 illustrated that the intermediate frame 308 is stored in the same memory 310 as the application window surfaces, in other examples, the intermediate frame 308 may be stored in a separate memory. The compositor 306 may be implemented as a hardware unit or a hardware block as part of the display subsystem, and it may perform its operations with or without involving a central processing unit (CPU) or a graphical processing unit (GPU). As an example, the compositor 306 may perform a so-called "Bit Blit" operation in which several bitmaps are combined into one.

While there is at least an equal number of previously non-selected application window surfaces 302b, 302c left to be composited as there are available hardware layers 304, at least one of the remaining previously non-selected application window surface 302b, 302c is selected. In the example of FIG. 3, next three application window surfaces 302b may be selected. The newly selected application window surfaces 302b and the intermediate frame 308 may be then fed to the available hardware layers 304. Because the number of the remaining non-selected application window surfaces 302b, 302c was at least equal to the number of the hardware layers, each of the available hardware layers 304 is fed with one of the previously non-selected application window surfaces 302b or the intermediate frame. Thus, after the first composition round "1", the number of elements to be composited that are fed to the display subsystem again corresponds to the number of the hardware layers 304. However, this time, instead of feeding each of the hardware layers 304 with the application window surfaces 302a, the intermediate frame 308 stored in the memory 310 is included and aggregated with a second set of application window surfaces 302b. This step is illustrated in FIG. 3 with "2". The contents of the hardware layers 304 are again composited by the compositor 306. The resulting subsequent frame may be stored again in memory 310, and the previously stored intermediate frame may be replaced with the new frame, i.e. the subsequent frame.

Now, after the application window surfaces 302a and 302b have already been processed, and when the number of the remaining previously non-selected application window surfaces 302c is smaller than the number of the hardware layers 304, the remaining previously non-selected application window surface 302c may be selected. The intermediate frame 308 stored in the memory 310 and the remaining previously non-selected window surface 302c are fed to the hardware layers 304. This step is illustrated in FIG. 3 with "3". Again, the contents of the hardware layers 304 may be composited in the compositor 306 into the subsequent frame. As there are no longer remaining previously non-selected application window surfaces 302 left to be composited, the resulting subsequent frame may be considered as a final frame. In an example, the final frame may also be provided for a virtual display as an output alternative, for example, for screen recording into a file or for sending the final frame over a network or an interface (for example, a Universal Serial Bus (USB)) to a television or to other appliances. FIG. 3 illustrates an example in which the final frame may also be encoded by a primary display encoder 312 to be viewed in, for example, a primary display. In addition or alternatively, the final frame may be encoded into formats used by peripherals with an external connector encoder 314 enabling viewing of the final frame, for example, with a monitor having a High-Resolution Multimedia Interface (HDMI).

In an example, the display subsystem 300 may be implemented as a system-on-a-chip (SoC) 316.

Figure 4:
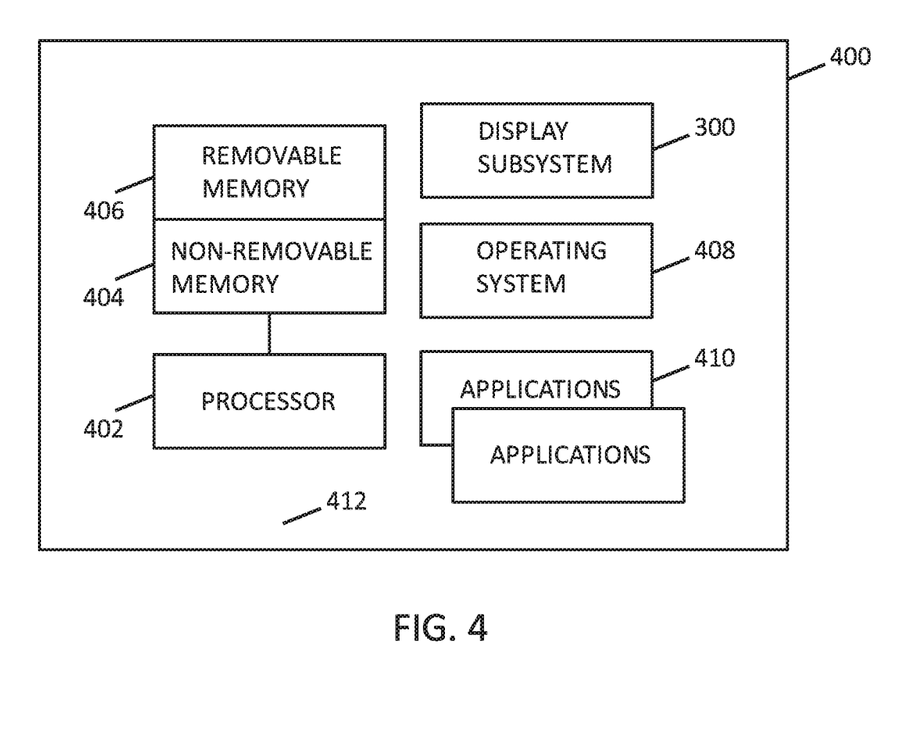
FIG. 4 illustrates a schematic representation of an apparatus for display contents generation.

FIG. 4 illustrates a schematic representation of an exemplary apparatus 400 including a variety of optional hardware and software components, shown generally at 412. Any components 412 in the computer system can communicate with any other component, although not all connections are shown, for ease of illustration. The apparatus 400 can be any of a variety of computing devices, for example, a smart phone, a tablet computer, a desktop computer and a laptop computer.

The illustrated apparatus 400 can include one or more controllers or processors 402 (e.g., signal processor, microprocessor, ASIC, or other control and processing logic circuitry) for performing such tasks as signal coding, data processing, input/output processing, power control, and/or other functions. An operating system 408 can control the allocation and usage of the components 412 and support for one or more application programs 410. The illustrated apparatus 400 can also include the display subsystem 300 discussed in more detail in relation to FIG. 3.

The illustrated apparatus 400 can include a memory. The memory can include a non-removable memory 404 and/or a removable memory 406. The non-removable memory 404 can include RAM, ROM, flash memory, a hard disk, or other well-known memory storage technologies. The removable memory 406 can include flash memory or other well-known memory storage technologies. The memory can be used for storing data and/or code for running the operating system 408 and the applications 410. The apparatus 400 can further include at least one physical connector, which can be a USB port, IEEE 1394 (FireWire) port, and/or RS-232 port etc. The illustrated components 412 are not required or all-inclusive, as any components can deleted and other components can be added.

The apparatus 400 may be configured to implement the various features, examples and embodiments illustrated in FIGS. 2-3 partially or completely. The functionality described herein can be performed, at least in part, by one or more computer program product components such as software components. According to an example, the processor 402 may be configured by the program code which when executed performs the examples and embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

Further, one or more of the disclosed elements or components 412 of the apparatus 400 may constitute means for selecting data of multiple application window surfaces stored in a memory, wherein an initial number of the application window surfaces exceeds the number of available hardware layers of a display subsystem; means for feeding the data of the selected multiple window surfaces to the available hardware layers; means for compositing an intermediate frame by the compositor based on the contents of the fed hardware layers; means for selecting data of at least one previously non-selected application window surface stored in the memory; means for feeding the intermediate frame and data of the selected at least one previously non-selected application window surface to the available hardware layers; and means for compositing a subsequent frame by the compositor based on the contents of the fed hardware layers.

The functionality of the apparatus 400 may be implemented by program instructions stored on a computer readable medium. The program instructions, when executed, cause the computer, processor or the like, to perform the steps of the encoding and/or decoding methods. The computer readable medium can be any medium, including non-transitory storage media, on which the program is stored such as a Blu-Ray disc, DVD, CD, USB (flash) drive, hard disc, server storage available via a network, a ROM, a PROM, an EPROM, an EEPROM or a Flash memory having electronically readable control signals stored thereon which cooperate or are capable of cooperating with a programmable computer system such that an embodiment of at least one of the inventive methods is performed. An embodiment of the invention comprises or is a computer program comprising program code for performing any of the methods described herein, when executed on a computer. Another example of the invention comprises or is a computer readable medium comprising a program code that, when executed by a processor, causes a computer system to perform any of the methods described herein.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one example or may relate to several examples. The examples are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method, blocks or elements identified, but that such blocks or elements do not comprise an exclusive list and a method or apparatus may contain additional blocks or elements.

Although the invention and its advantages have been described in detail with reference to specific features and embodiments thereof, it is evident that various changes, modifications, substitutions, combinations and alterations can be made thereto without departing from the spirit and scope as defined by the appended claims. The specification and drawings are, accordingly, to be regarded simply as an illustration as defined by the appended claims, and are contemplated to cover any and all modifications, variations, combinations or equivalents that fall within the scope of the present subject-matter.

The invention claimed is:

1. A method for display contents generation, the method comprising:
   selecting data of a plurality of application window surfaces stored in a memory, wherein an initial number of the application window surfaces exceeds a number of hardware layers of a display subsystem;
   feeding data of the selected plurality of application window surfaces to the hardware layers;

compositing an intermediate frame by a compositor of the display subsystem based on contents of the fed hardware layers;

comparing a number of previously non-selected application window surfaces stored in the memory to the number of hardware layers;

based on a result of the comparing, further selecting data of at least one previously non-selected application window surface stored in the memory;

further feeding the intermediate frame and data of the further selected at least one previously non-selected application window surface to the hardware layers, wherein feeding the intermediate frame and data of the further selected at least one previously non-selected application window surface to the hardware layers comprises, when the number of the previously non-selected application window surfaces is equal or exceeds the number of the hardware layers, feeding each of the hardware layers with one of the previously non-selected application window surfaces or the intermediate frame; and further compositing a subsequent frame by the compositor based on contents of the further fed hardware layers.

2. The method of claim 1, wherein an initial number of the selected plurality of application window surfaces corresponds to the number of the hardware layers.

3. The method of claim 1, the method further comprising:
storing the intermediate frame in the memory.

4. The method of claim 3, the method further comprising:
storing the subsequent frame in the memory by replacing the previously stored intermediate frame.

5. The method of claim 1, wherein when the number of the previously non-selected application window surfaces is equal or exceeds the number of the hardware layers after the further compositing, the method further comprises:

still further selecting data of at least one previously non-selected application window surface stored in the memory;

still further feeding the subsequent frame and data of the still further selected at least one previously non-selected application window surface to the hardware layers; and compositing another subsequent frame by the compositor based on contents of the still further fed hardware layers.

6. The method of claim 1, wherein further selecting data of the at least one previously non-selected application window surface comprises selecting all of the previously non-selected application window surfaces when the number of the previously non-selected application window surfaces is smaller than the number of
hardware layers.

7. The method of claim 6, wherein the subsequent frame comprises a final frame, and the method further comprises:

causing transmission of the final frame to at least one of at least one display connector, at least one external connector and a virtual display.

8. An apparatus comprising:
a memory configured to store data of application window surfaces;
a display subsystem comprising a plurality of hardware layers and a compositor;
wherein the apparatus is configured to:
select data of a plurality of the application window surfaces stored in the memory, wherein an initial number of the application window surfaces exceeds a number of the hardware layers of the display subsystem;

feed data of the selected plurality of application window surfaces to the hardware layers;

composite an intermediate frame by the compositor based on contents of the fed hardware layers;

compare a number of previously non-selected application window surfaces stored in the memory to the number of hardware layers;

based on a result of the compare, further select data of at least one previously non-selected application window surface stored in the memory;

further feed the intermediate frame and data of the further selected at least one previously non-selected application window surface to the hardware layers, wherein feeding the intermediate frame and data of the further selected at least one previously non-selected application window surface to the hardware layers comprises, when the number of the previously non-selected application window surfaces is equal or exceeds the number of the hardware layers, feeding each of the hardware layers with one of the previously non-selected application window surfaces or the intermediate frame; and further composite a subsequent frame by the compositor based on contents of the fed hardware layers.

9. The apparatus of claim 8, wherein an initial number of the selected application window surfaces corresponds to the number of the hardware layers.

10. The apparatus of claim 8, wherein the apparatus is configured to:
store the intermediate frame in the memory.

11. The apparatus of claim 10, wherein the apparatus is configured to:
store the subsequent frame in the memory by replacing the previously stored intermediate frame.

12. The apparatus of claim 8, wherein when feeding the intermediate frame and data of the selected at least one previously non-selected application window surface to the hardware layers, the apparatus is configured to, when the number of the previously non-selected application window surfaces is equal or exceeds the number of the hardware layers, feed each of the hardware layers with one of the previously non-selected application window surfaces or the intermediate frame.

13. The apparatus of claim 8, wherein when the number of the previously non-selected application window surfaces is equal or exceeds the number of the hardware layers after the further compositing, wherein the apparatus is further configured to:

still further select data of at least one previously non-selected application window surface stored in the memory;

still further feed the subsequent frame and data of the still further selected at least one previously non-selected application window surface to the hardware layers; and composite another subsequent frame by the compositor based on the contents of the still further fed hardware layers.

14. The apparatus of claim 8, wherein when further selecting data of the at least one previously non-selected application window surface, the apparatus is configured to select all of the previously non-selected application window surfaces when the number of the previously non-selected application window surfaces is smaller than the number of hardware layers.

15. The apparatus of claim 14, wherein the subsequent frame comprises a final frame, and the apparatus is configured to:
cause transmission of the final frame to at least one of at least one display connector, at least one external connector and a virtual display.

16. A non-transitory computer readable storage medium comprising program code which, when executed by one or more processors, cause the one or more processors to perform operations including:
selecting data of a plurality of application window surfaces stored in a memory, wherein an initial number of the application window surfaces exceeds a number of hardware layers of a display subsystem;
feeding data of the selected plurality of application window surfaces to the hardware layers;
compositing an intermediate frame by a compositor of the display subsystem based on contents of the fed hardware layers;
comparing a number of previously non-selected application window surfaces stored in the memory to the number of hardware layers;
based on a result of the comparing, further selecting data of at least one previously non-selected application window surface stored in the memory;
further feeding the intermediate frame and data of the further selected at least one previously non-selected application window surface to the hardware layers, wherein feeding the intermediate frame and data of the further selected at least one previously non-selected application window surface to the hardware layers comprises, when the number of the previously non-selected application window surfaces is equal or exceeds the number of the hardware layers, feeding each of the hardware layers with one of the previously non-selected application window surfaces or the intermediate frame; and
further compositing a subsequent frame by the compositor based on contents of the further fed hardware layers.

17. The non-transitory computer readable storage medium according to claim 16, wherein the operations further include:
feeding each of the hardware layers with one of the previously non-selected application window surfaces or the intermediate frame when the number of the previously non-selected application window surfaces is equal or exceeds the number of the hardware layers.

18. The non-transitory computer readable storage medium according to claim 16, wherein when the number of the previously non-selected application window surfaces is equal or exceeds the number of the hardware layers after the further compositing, the operations further include:
still further selecting data of at least one previously non-selected application window surface stored in the memory;
still further feeding the subsequent frame and data of the still further selected at least one previously non-selected application window surface to the hardware layers; and
compositing another subsequent frame by the compositor based on the contents of the still further fed hardware layers.

19. The non-transitory computer readable storage medium according to claim 16, wherein the operations further include:
selecting all of the previously non-selected application window surfaces when the number of the previously non-selected application window surfaces is smaller than the number of hardware layers.

* * * * *